(12) United States Patent
Kofman et al.

(10) Patent No.: US 11,795,913 B2
(45) Date of Patent: Oct. 24, 2023

(54) TURNER GEAR ASSEMBLY FOR WIND TURBINES AND METHOD OF USING SAME

(71) Applicant: Vestas Wind Systems A/S, Aarhus N (DK)

(72) Inventors: Joris Kofman, Aalborg Øst (DK); Dan Mølgaard Mathiasen, Hinnerup (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/913,466

(22) PCT Filed: Mar. 22, 2021

(86) PCT No.: PCT/DK2021/050084
§ 371 (c)(1),
(2) Date: Sep. 22, 2022

(87) PCT Pub. No.: WO2021/190719
PCT Pub. Date: Sep. 30, 2021

(65) Prior Publication Data
US 2023/0137592 A1 May 4, 2023

(30) Foreign Application Priority Data
Mar. 23, 2020 (DK) .......................... PA 2020 70179

(51) Int. Cl.
*F03D 13/10* (2016.01)
*F03D 1/06* (2006.01)
*F16H 19/08* (2006.01)

(52) U.S. Cl.
CPC ............... *F03D 13/10* (2016.05); *F03D 1/06* (2013.01); *F16H 19/08* (2013.01);
(Continued)

(58) Field of Classification Search
CPC ............. F03D 13/10; F03D 1/06; F16H 19/08
See application file for complete search history.

(56) References Cited

U.S. PATENT DOCUMENTS 8,907,517 B2 * 12/2014 Mongeau ................ F03D 15/10
290/55
9,359,995 B2 * 6/2016 Trede ........................ F03D 1/06
(Continued)

FOREIGN PATENT DOCUMENTS

CN          204113552 U       1/2015
CN          106762459 A       5/2017
(Continued)

OTHER PUBLICATIONS

English Translation of WO-2014076826-A1 (Year: 2014).*
(Continued)

*Primary Examiner* — Jason L Vaughan
(74) *Attorney, Agent, or Firm* — Wood Herron & Evans LLP (57) ABSTRACT

A turner gear assembly (52) for turning an unbalanced rotor of a wind turbine (10) having a drivetrain (30). The turner gear assembly (52) includes a turner gear (50) configured to couple to the drivetrain (30) and having at least two motors (58a, 58b), and a valve block (78) connectable to the turner gear (50) and having a first flow control valve (106) configured to be in fluid communication with a pump (80) and with the at least two motors (58a, 58b). The first flow control valve (106) is selectively moveable between a first fluid control position (106a) and a second fluid control position (106b). When the first flow control valve (106) is in the first fluid control position (106a), the at least two motors (58a, 58b) operate in parallel and when the first flow control valve (106) is in the second fluid control position (106b), the at least two motors (58a, 58b) operate in series. A method of operating the turner gear assembly is also disclosed.

20 Claims, 9 Drawing Sheets

(52) U.S. Cl.
CPC ... *F05B 2230/604* (2013.01); *F05B 2240/221* (2013.01); *F05B 2260/31* (2020.08)

(56) References Cited

U.S. PATENT DOCUMENTS

| | | | |
|---|---|---|---|
| 11,499,527 B2 * | 11/2022 | Fynbo | .................... F03D 13/40 |
| 2015/0308467 A1 | 10/2015 | Brokes et al. | |
| 2016/0032782 A1 | 2/2016 | Campbell et al. | |

FOREIGN PATENT DOCUMENTS

| | | | | |
|---|---|---|---|---|
| CN | 110296112 A | 10/2019 | | |
| EP | 2573384 A1 | 3/2013 | | |
| EP | 2927480 A1 | 10/2015 | | |
| JP | 2014076825 A | 5/2014 | | |
| KR | 101346178 B1 | 12/2013 | | |
| WO | WO-2014076826 A1 * | 5/2014 | ............. | B66C 1/108 |
| WO | 2016182461 A1 | 11/2016 | | |

OTHER PUBLICATIONS

Danish Patent and Trademark Office, Search and Examination Report in PA 2020 70179, dated Sep. 4, 2020.
European Patent Office, International Search Report and Written Opinion in PCT Application No. PCT/DK2021/050084, dated Jun. 9, 2021.

* cited by examiner

TURNER GEAR ASSEMBLY FOR WIND TURBINES AND METHOD OF USING SAME

TECHNICAL FIELD

The invention relates generally to wind turbines, and more particularly to a turner gear assembly for use while installing wind turbine blades on a wind turbine, and to methods of using such a turner gear assembly especially during wind turbine blade installation.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower and an energy generating unit positioned atop of the tower. The energy generating unit typically includes a nacelle to house mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator.

Wind turbines are typically assembled on the site where the wind turbine will operate. For example, at the site the tower is erected and an energy generating unit, is place at the top of the tower. Then, the individual blades may be attached one at a time to blade bearings circumferentially spaced about the central hub on the energy generating unit. In one specific method to attach the first blade, the central hub is rotated so that a first blade bearing on the central hub is rotated to generally the three o'clock position, for example, (or alternatively the six o'clock position). In this orientation, a generally horizontally oriented blade is lifted via a lifting device, such as a crane, and then attached to the first blade bearing. After the first blade is attached to the central hub, the central hub and the first blade are rotated until a second blade bearing is generally in the three o'clock position and the second blade is lifted and attached to the second blade bearing. Again, the central hub and the first and second blades are rotated until a third blade bearing is generally in the three o'clock position and the third blade is lifted up and attached to the third blade bearing. To facilitate rotating the central hub to orient the blade bearings on the central hub, a turner gear is typically used. The turner gear is configured to drive the rotor mainshaft in rotation, especially when the wind turbine is decommissioned or prior to its commissioning. The turner gear is not normally an integral part of the drivetrain of a wind turbine but may be installed and operated solely to assist with rotating a hub or rotor, for example during installation of blades to the rotor hub. Thus, after the blades are installed on the hub, the turner gear may be removed from the wind turbine. The turner gear may be powered by electric power or sometimes by hydraulic power. In the case of a hydraulically powered turner gear, hydraulic drive elements of the turner gear are typically coupled to a hydraulic pump. Such a pump may be portable along with the turner gear, and may therefore be installed to or removed from the wind turbine respectively before or after use. Typically, the turner gear may be coupled, directly or indirectly, to the main shaft to which the rotor hub is connected. During the blade mounting process, an operator may command the turner gear to turn the main shaft e.g. clockwise or counterclockwise so as to orient the hub for attachment of successive blades.

When the hub has only one or two blades attached, the rotor is considered to be in an unbalanced condition. The torque needed to turn the rotor, when it is unbalanced is higher than when the rotor is in a balanced condition, i.e., when all its blades are installed. Furthermore, a rotor comprising larger, heavier blades will require higher turning torques than with smaller, lighter blades. Also, if the wind turbine site experiences high winds during installation, this may increase the torque needed to rotate the unbalanced rotor. Thus, a turner gear must be capable of generating enough torque to rotate the rotor in an unbalanced condition. An unbalanced rotor may typically comprise a hub with only a single attached blade, or with only two attached blades.

A turner gear may comprise one or more torque motors. As mentioned, these may be electrically or hydraulically driven. Torque motors may be attached to drive, directly or indirectly, the main shaft of the wind turbine. In some cases, torque motors of a turner gear may be installed at or near a gearbox of a drivetrain, thereby to drive a gearbox shaft in rotation, which may thereby turn the rotor hub to the desired position for blade attachment. In general, when a gearbox is present in a wind turbine powertrain, the rotor is coupled to the low speed shaft of the gearbox, sometimes known as an input shaft. A turner gear may be installed to drive a high speed shaft of a gearbox, to thereby use the gearbox to increase the applied torque. A high speed gearbox shaft may also be known as an output shaft thereof.

When one or more hydraulic motors are used in a turner gear, then these are driven using a hydraulic fluid pump. By way of example, a plurality of hydraulic motors may be connected in parallel to a hydraulic pump such that each motor receives the same fluid flow and pressure, which is delivered by the hydraulic pump. The hydraulic motors are thereby run in parallel so that if one of the hydraulic motors fails, the others will remain operational to at least put the hub in a safe condition until the failed hydraulic motor is fixed. Operating the hydraulic motors in parallel allows the hydraulic motors to generate maximum torque but may limit how fast they can each turn when driven by a hydraulic pump with a fixed fluid flow rate.

A wind turbine manufacturer may connect a turner gear to a pre-installed hydraulic pump in the wind turbine, e.g. in the nacelle. A pre-installed hydraulic pump may for example be used to power other systems in the wind turbine, such as e.g. blade pitch drive elements. Alternatively, a turner gear may be associated with or may comprise one or more dedicated hydraulic pump, which may be temporarily installed in the nacelle for the sole purpose of operating the turner gear. That installed hydraulic pump may be sized to provide a fixed fluid flow rate based on the needs of a particular wind turbine. For example, a wind turbine with large, heavy wind turbine blades will require a hydraulic pump sized to generate a greater fluid flow rate compared to a wind turbine with smaller, lighter blades, which will require a smaller hydraulic pump which generates a lower fluid flow rate.

The speed at which the turner gear can turn the hub or rotor is directly related to the fluid flow rate generated by the hydraulic pump. Thus, a turner gear coupled to a hydraulic pump with one fluid flow rate may rotate the rotor 120 degrees in 40 minutes, whereas the same turner gear may take 80 minutes to turn a rotor 120 degrees when coupled to a hydraulic pump generating half the fluid flow rate. This reduced rotational rate can impact the time it takes to install all of the blades. This situation may occur if the same turner gear is utilized in association with both large or small rotors. For example, a turner gear may be used with a large wind turbine where the "installed" hydraulic pump can generate a large fluid flow rate such that the turner gear may generate a large amount of torque at a given rotation speed. That same turner gear may then be removed and thereafter used during the assembly of a rotor at a smaller wind turbine whose installed hydraulic pump may generate a fluid flow rate that is appreciably less than that of the installed hydraulic pump on the larger wind turbine. As such, that same turner gear may turn at a correspondingly lower rotational speed, even while it is otherwise capable of generating more torque than required to rotate the smaller rotor on the smaller wind turbine. Consequently, that blade assembly process may take appreciably longer, even while the turner gear is capable of generating a higher torque than is needed for turning the smaller rotor. This means that more time is taken for turning a rotor than is strictly necessary when considering the power envelope of the turner gear.

An insight underlying the present disclosure resides in the recognition that there may be needed a turner gear that can generate sufficient torque and rotational speed in one wind turbine and then be reconfigured to generate a different torque and rotational speed in a different wind turbine. In this way, a wind turbine requiring less torque may use the same turner gear at lower torque output but rotate at an increased speed, thereby saving time during installation.

SUMMARY

To these and other ends, a turner gear assembly for turning an unbalanced rotor of a wind turbine having a drivetrain is disclosed. The turner gear assembly includes a turner gear configured to couple to the drivetrain and having at least two motors, and a valve block operatively connectable to the turner gear and including a first flow control valve configured to be in fluid communication with a pump and with the at least two motors of the turner gear. The first flow control valve is selectively moveable between a first fluid control position and a second fluid control position. When the first flow control valve is in the first fluid control position, the at least two motors are configured to operate in parallel. When the first flow control valve is in the second fluid control position, the at least two motors are configured to operate in series. The ability to configure the valve block to operate the at least two motors in parallel, in series, or not at all (e.g., in the case of three of more motors) allows the turner gear assembly to be configured to the specific torque and rotational speed needs across a wide range of wind turbine sizes. The at least two motors may include two or more motors. Where more than two motors are provided, there may preferably be a first, and a second flow control valve. Where more than three motors are provided, there may be a first, and a second and a third flow control valve or more.

In one embodiment, the turner gear may have first, second, and third turner gear motors. In this arrangement, the first flow control valve may be configured to be in fluid communication with a pump and with first and second turner gear motors and the valve block may further include a second flow control valve configured to be in fluid communication with the pump and with the second and third turner gear motors. The second flow control valve may be selectively moveable between a first fluid control position and a second fluid control position. The first and second fluid control positions of the respective first flow control valve and the second flow control valve may be selectively configured such that the first, second, and third motors operate in parallel, operate in series, or operate in a combination of parallel and series. In one exemplary arrangement, when the first flow control valve is in its first fluid control position and the second flow control valve is in its first fluid control position, the first, second and third motors may operate in parallel. In another exemplary arrangement, when the first flow control valve is in its second fluid control position and the second flow control valve is in its second fluid control position, the first, second, and third motors may operate in series. In yet another arrangement, when the first flow control valve is in its second fluid control position and the second flow control valve is in its first fluid control position, the first and second motors may operate in series and the third motor may operate in parallel to the combination of the first and second motors. The turner gear assembly may include a control unit configured to selectively move the first flow control valve between its first and second positions, and when the turner gear assembly includes a second flow control valve, the control unit may be configured to selectively move both the first and second flow control valves between their respective first and second positions.

In another embodiment, the turner gear may have first, second, third, and fourth turner gear motors. In this arrangement, the first flow control valve is configured to be in fluid communication with the first and second motors, and the valve block includes a second flow control valve configured to be in fluid communication with the pump and with the second and third motors. The second flow control valve may be selectively moveable between a first fluid control position and a second fluid control position. The valve block may additionally include a third flow control valve configured to be in fluid communication with the pump and with the third and fourth motors. The third flow control valve may be selectively moveable between a first fluid control position and a second fluid control position. In this embodiment, the first and second fluid control positions of the respective first, second, and third flow control valves may be selectively configured such that the first, second, third, and fourth motors operate in parallel, operate in series, or operate in a combination of parallel and series. In one exemplary arrangement, when the first flow control valve is in its second fluid control position, the second flow control valve is in its first fluid control position, and the third flow control valve is in its second fluid control position, the first and second motors operate in series with each other and the third and fourth motors operate in series with each other. Still further, the turner gear may have more than four turner gear motors. In such arrangements, and in any case, it is preferred for the turner gear motors to be connected to pressurised hydraulic fluid supply via an array of flow control valves in said valve block in such a way that the turner gear motors can be driven in either a series or parallel fluid flow connection relative to other motors, preferably also in a mixed configuration of series and parallel operating turner gear motors.

The valve block may include a flow direction valve operatively connected to the pump The flow direction valve may be selectively movable between first and second positions, where the first position is configured to allow the fluid flowing from the pump to move in a first fluid flow direction through the turner gear motors, and the second position configured to allow the fluid from the pump to move in a second fluid flow direction through the turner gear motors.

Accordingly, the turner gear motors are preferably configured to be bi-directional motors.

A drivetrain of a wind turbine may comprise elements including a rotor mainshaft, a mainshaft housing and a gearbox, the gearbox being drivingly coupled to the rotor mainshaft. The gearbox may comprise a low speed input shaft and a high speed output shaft. The input shaft may be operatively coupled to the rotor mainshaft. A generator may be coupled to the gearbox high speed shaft. In particular a generator may comprise a stator and a generator rotor, rotatable in relation to the stator on a generator rotor shaft. The generator rotor shaft may be coupled to the gearbox output shaft, i.e. the gearbox output shaft and the generator rotor shaft may be regarded as a high speed shaft of the drivetrain. The turner gear may be coupled to a drivetrain element of the wind turbine. In embodiments, the turner gear may be drivingly connected to a high speed shaft of the drivetrain. More particularly, the turner gear may be drivingly connected to a rotor shaft of the generator. Alternatively, the turner gear may be drivingly connected to a gearbox shaft which may preferably be a gearbox output shaft. Alternatively, in embodiments, the turner gear may be drivingly coupled to a low speed, input shaft of the gearbox, or to the blade rotor mainshaft.

The pump may in particular be a hydraulic pump or a group of hydraulic pumps. In embodiments the pump may be a part of the wind turbine. For example, the pump may be part of a blade pitch control system of the wind turbine. Alternatively, a turner gear assembly may include a pump, in particular a pump which may be temporarily installed and removed along with the turner gear, successively at one or more wind turbines.

In yet another embodiment, there is disclosed a method of operating the turner gear assembly as described above for turning an unbalanced rotor of a wind turbine. The method includes installing a turner gear at a wind turbine drivetrain by coupling the turner gear to a relevant drivetrain element, and thereafter selecting between the first fluid control position and the second fluid control position of the first flow control valve, such that when the first fluid control position is selected, the at least two motors run in parallel, and when the second fluid control position is selected, the at least two motors run in series, and operating the turner gear assembly with the first fluid control valve in the selected fluid control position.

For example, in one embodiment of the method, the turner gear may have first, second, and third motors and the first flow control valve in fluid communication with the first and second motors. A valve block of the turner gear assembly may further include a second flow control valve in fluid communication with the pump and with the second and third motors, the second flow control valve being selectively moveable between a first fluid control position and a second fluid control position. The method may further include selecting between the first fluid control position and the second fluid control position of the second flow control valve, such that the first, second, and third motors operate in parallel, operate in series, or operate in a combination of parallel and series.

In still a further embodiment, a method of turning an unbalanced rotor of a wind turbine using a turner gear assembly is disclosed. The method includes providing a first wind turbine having a central hub with a plurality of blade attachment sites, the first wind turbine further having a drivetrain operatively coupled to the central hub; providing a turner gear assembly as described above; attaching the turner gear to the drivetrain of the first wind turbine and operatively connecting the valve block to the turner gear; configuring the valve block to operate the at least two turner gear motors in a first operational mode; operating a pump of the turner gear assembly to actuate the at least two motors and turn the central hub until one of the plurality of blade sites is in a blade handling position; attaching/removing a wind turbine blade to/from the blade site at the blade handling position; and repeating the operating and attaching steps until the first wind turbine has all of its wind turbine blades attached/removed to/from a respective one of the plurality of blade sites.

The method may further include removing the turner gear assembly from the first wind turbine; providing the turner gear assembly to a second wind turbine having a central hub with a plurality of blade sites; attaching the turner gear to a drivetrain of the second wind turbine and operatively connecting the valve block to the turner gear; configuring the valve block to operate in a second operational mode different from the first operational mode; operating a pump of the turner gear assembly to actuate the at least two motors and turn the central hub until one of the plurality of blade sites is in a blade handling position; attaching/removing a wind turbine blade to/from the blade site at the blade handling position; and repeating the operating and attaching steps until the second wind turbine has all of its wind turbine blades attached/removed to/from a respective one of the plurality of blade sites.

In one embodiment, operating the pump further comprises coupling the turner gear to a hydraulic system of the wind turbine having a pump and operating the pump of the wind turbine hydraulic system to drive the turner gear motors. The hydraulic system may be the pitch control system of the wind turbine.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
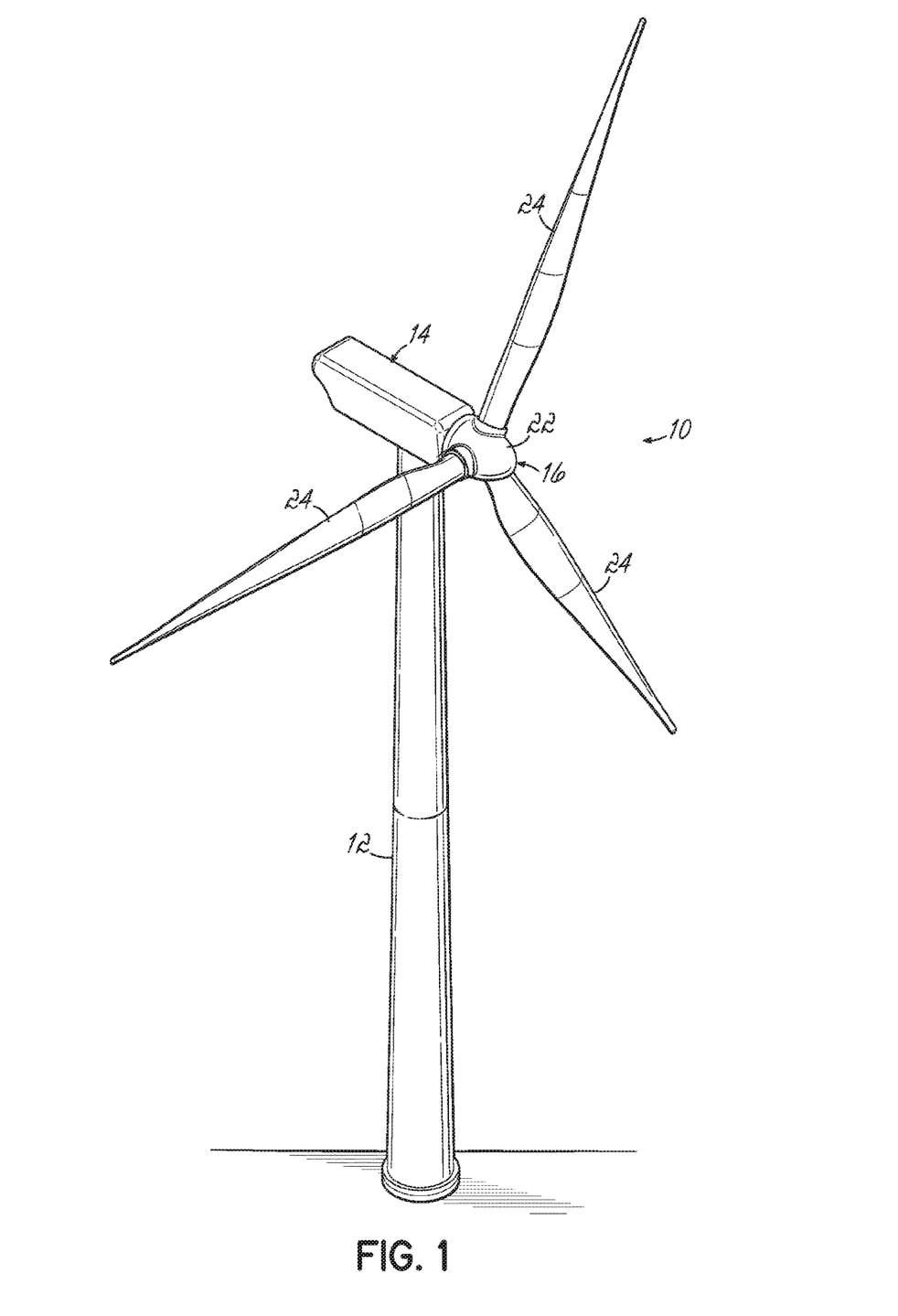
FIG. 1 is a perspective view of a wind turbine having a tower and an energy generating unit.
Figure 2:
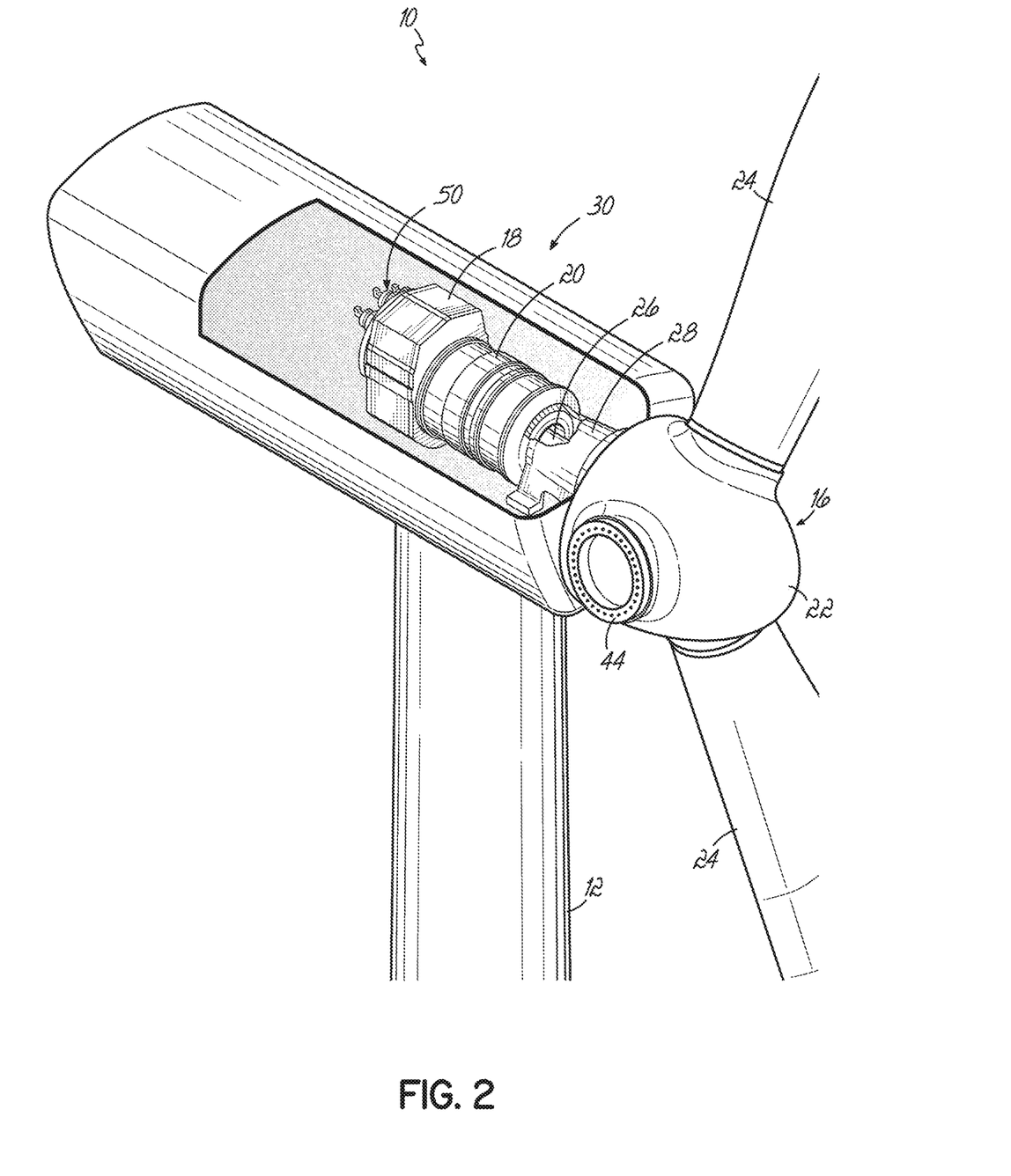
FIG. 2 is an enlarged partial perspective view of the wind turbine of FIG. 1 illustrating wind turbine components in the nacelle.

With reference to FIGS. 1 and 2, a wind turbine 10 includes a tower 12, a nacelle 14 disposed at the apex of the tower 12, and a rotor 16 operatively coupled to a generator 18 via a gearbox 20 housed inside the nacelle 14. In addition to the generator 18 and gearbox 20, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16, also known as a blade rotor 16, may include a central hub 22, otherwise known or referred to herein as a rotor hub 22 or hub 22. The blade rotor 16 may include a plurality of blades 24 attached to the central hub 22 at locations distributed about the circumference of the central hub 22. In the representative embodiment, the rotor 16 includes three blades 24, however the number may vary. The blades 24, which project radially outward from the central hub 22, are configured to interact with passing air currents to produce rotational forces that cause the rotor 16, including its hub 22, to spin about its rotational axis. The rotational axis of the hub 22 and rotor 16 may in particular correspond to the longitudinal axis of the rotor mainshaft 26. The design, construction, and operation of the blades 24 are familiar to a person having ordinary skill in the art of wind turbine design and may include additional functional aspects to optimize performance. For example, pitch angle control of the blades 24 may be implemented by a pitch control mechanism (not shown) responsive to wind velocity to optimize power production in low wind conditions, and to feather the blades if wind velocity exceeds design limitations.

The rotor 16 may be coupled to the gearbox 20 directly or, as shown, indirectly via a mainshaft 26 extending between the hub 22 and the gearbox 20. The main shaft 26 rotates with the rotor 16 and is supported within the nacelle 14 by a main bearing support 28, or mainshaft housing 28, which supports the weight of the rotor 16 and transfers the rotor 16 loads on to the tower 12, possibly via a nacelle bedframe. A gearbox 20 transfers the rotation of the rotor 16 to a generator 18. This transfer of rotational motion between a gearbox 20 and a generator 18 may take place via a coupling between a gearbox output shaft and a generator rotor shaft of the generator 18. Wind exceeding a minimum level may activate the rotor 16, causing the rotor 16 to rotate in a direction substantially perpendicular to the wind, applying torque to the rotor mainshaft 26 and thereby also to the input shaft of the gearbox 20, which in turn applies a torque to the generator rotor shaft of the generator 18. The electrical power produced by the generator 18 may be supplied to a power grid (not shown) or an energy storage system (not shown) for later release to the grid as understood by a person having ordinary skill in the art. In this way, the kinetic energy of the wind may be harnessed by the wind turbine 10 for power generation.

Figure 3:
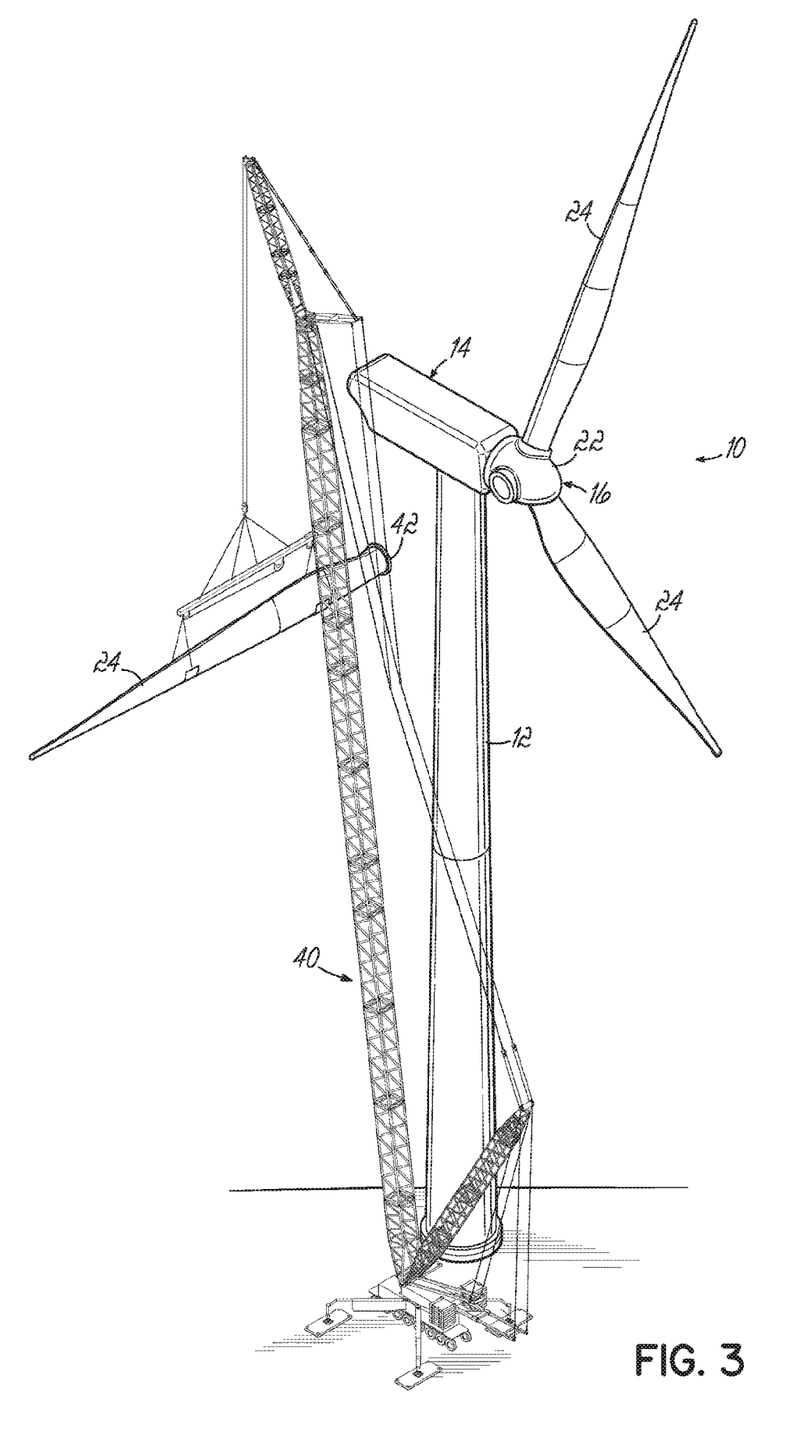
FIG. 3 is a perspective view showing a crane lifting a wind turbine blade to a partially assembled wind turbine.

With reference to FIG. 3, the wind turbine 10 is shown with two blades 24 attached to the hub 22. A lifting device 40, such as a crane, is shown lifting the third blade 24 so a root end 42 of the blade 24 may be attached to a blade site 44, such as a blade pitch-bearing on the central hub 22. As shown in FIG. 3, the central hub 22 has been rotated after the second blade 24 was attached so that the blade pitch-bearing 44 is generally at the nine o'clock position (as viewed facing the central hub 22). The blade pitch-bearing 44 at the nine o'clock position (or alternatively in the 3 o'clock position) may be considered a blade handling position where the blade 24 may be either attached to or removed from the central hub 22. With the blade pitch-bearing 44 in that position, the lift device 40 may lift the blade 24 in a generally horizontal orientation to facilitate attaching it to the blade pitch-bearing 44. Alternatively, the central hub 22 may be rotated so that the blade pitch-bearing 44 is generally at the six o'clock position. The six o'clock position may also be considered another blade handling position where the blade 24 may be either attached to or removed from the central hub 22. In that orientation, the lifting device 40 may lift the blade 24 in a generally vertical orientation.

While FIG. 3 illustrates the third blade 24 arranged to be attached to the blade pitch-bearing 44, the first and second blades 24 may be attached in a similar fashion. To attach the first blade 24, for example, a turner gear 50 (FIG. 6), which may be coupled to a drivetrain, is operated to rotate the main shaft 26 and thereby also the central hub 22. The turner gear 50 rotates the rotor hub 22 until the blade pitch-bearing 44 is in the desired position (three, six, or nine o'clock position) depending the orientation of the blade 24 when lifted. After the first blade 24 is attached, the turner gear 50 is operated to turn the rotor hub 22 until the next blade pitch-bearing 44 is in the desired position. This process is repeated until all the blades 24 are attached to the central hub 22, making up a blade rotor 16. While the wind turbine 10 in FIGS. 1-3 is shown with three blades 24, other wind turbines 10 may have more or less than three blades 24. As used herein, the term "drivetrain," schematically illustrated at 30 in FIG. 2, may include one or more of a rotor main shaft, a gearbox, and a generator. A drivetrain may also comprise a rotor mainshaft bearing and a rotor mainshaft housing 28. A drivetrain which comprises a generator may sometimes be referred to as a powertrain. In this specification, the term "drivetrain" is used to denote a drivetrain with or without a generator, although a drivetrain 30 shown in the drawings includes a generator 18, which may be preferred in the present context. The rotor mainshaft is considered a "low-speed shaft" that turns an input shaft of the gearbox. The gearbox has an output shaft, considered a "high-speed shaft", that drives the generator. As such, the turner gear 50 may be coupled on the one hand to the rotor mainshaft or the low-speed, input shaft of the gearbox, or on the other hand, the turner gear 50 may be coupled to the high-speed, output shaft of the gearbox, or to the rotor shaft of the generator, which may be considered a continuation of the high-speed shaft of the gearbox.

When one blade 24 is attached to a central hub 22, the rotor 16 is considered to be "unbalanced", in particular when considered relative to the rotation axis of the central hub 22. In that unbalanced condition, the turner gear 50 must generate more torque to turn the central hub 22 compared to when all the blades 24 are attached to the central hub 22, which is considered a "balanced" condition of the blade rotor 16.

Figure 4:
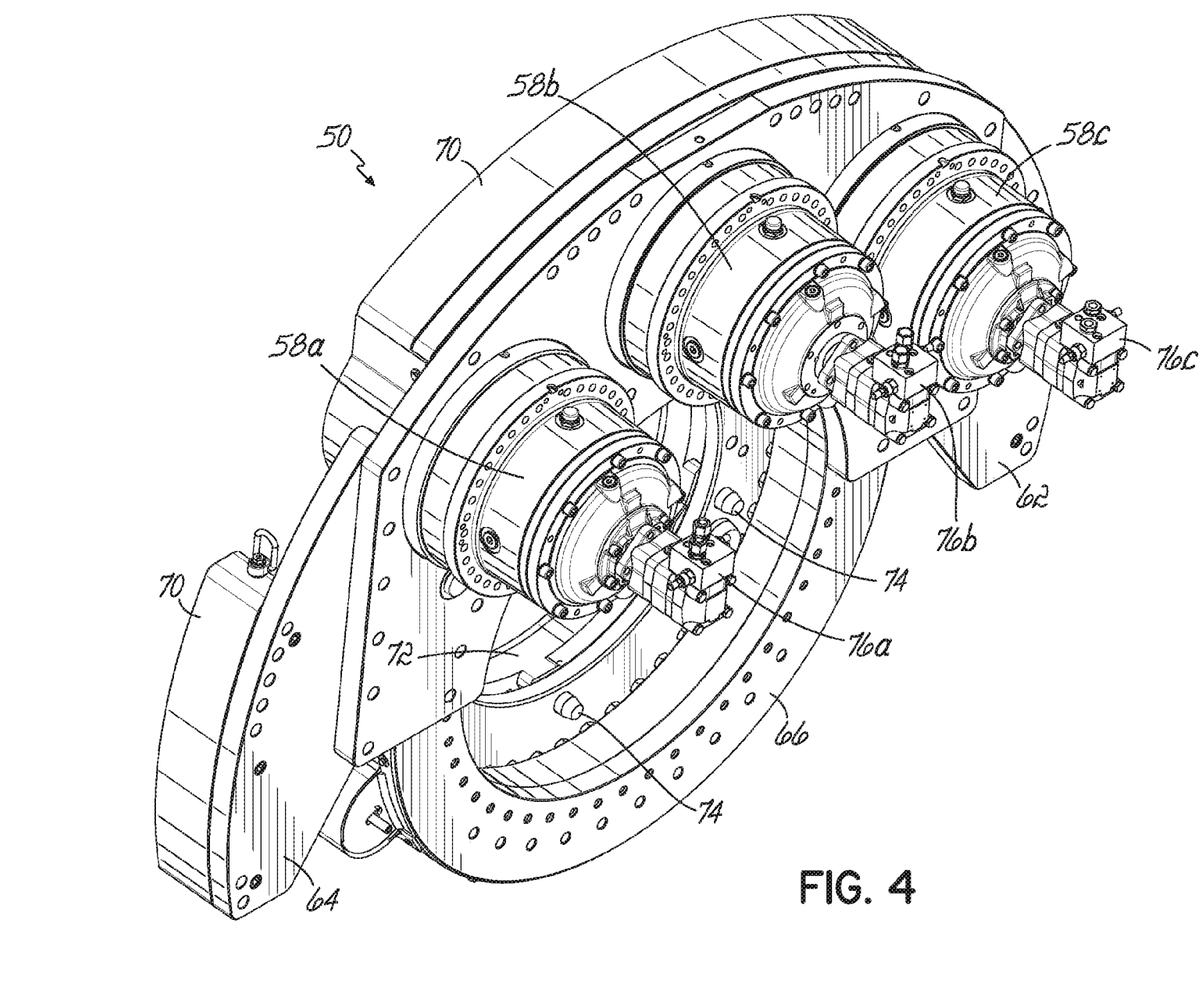
FIG. 4. is a perspective view of one side of a turner gear.
Figure 5:
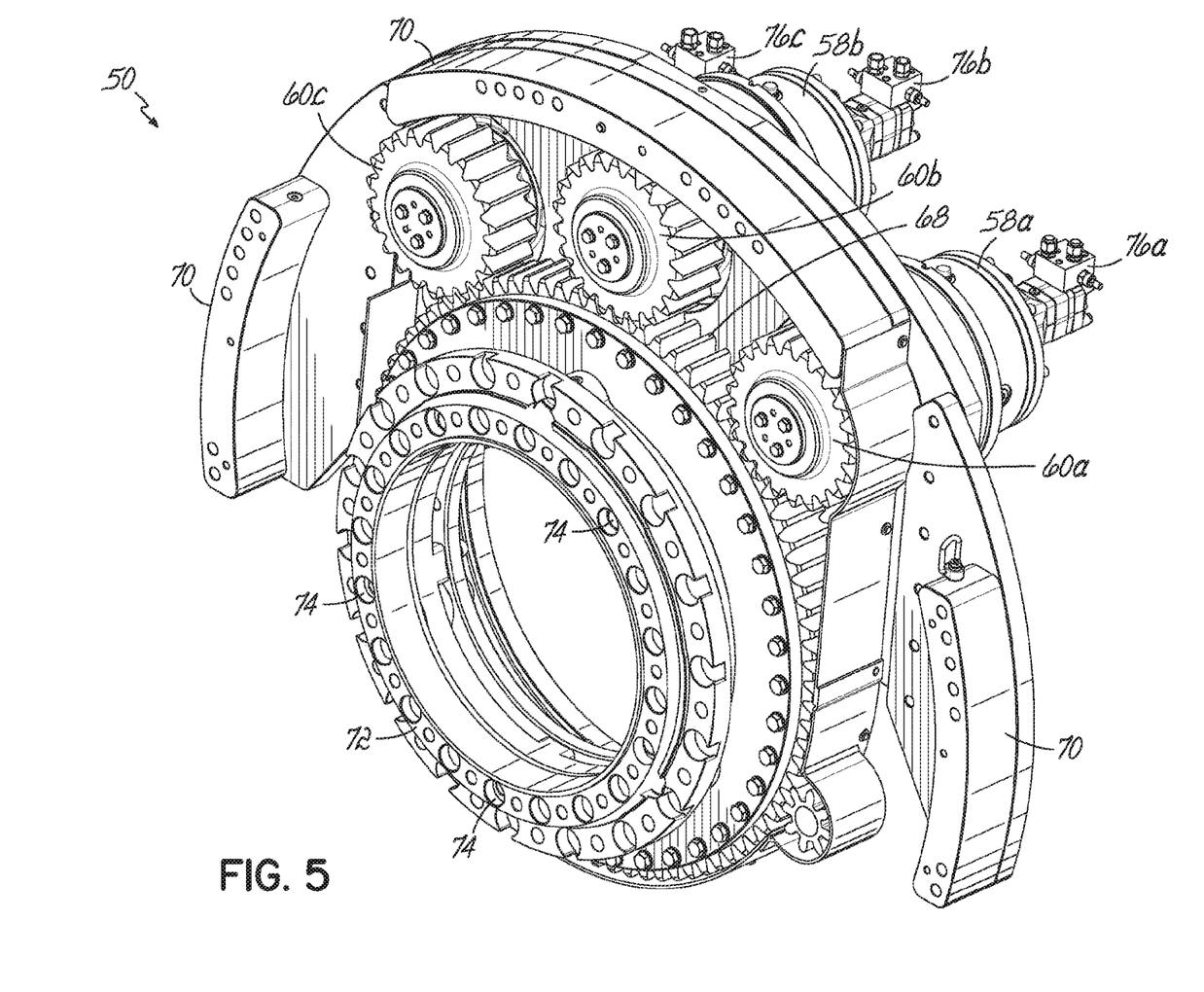
FIG. 5. is a perspective view of the other side of the turner gear of FIG. 4.
Figure 6:
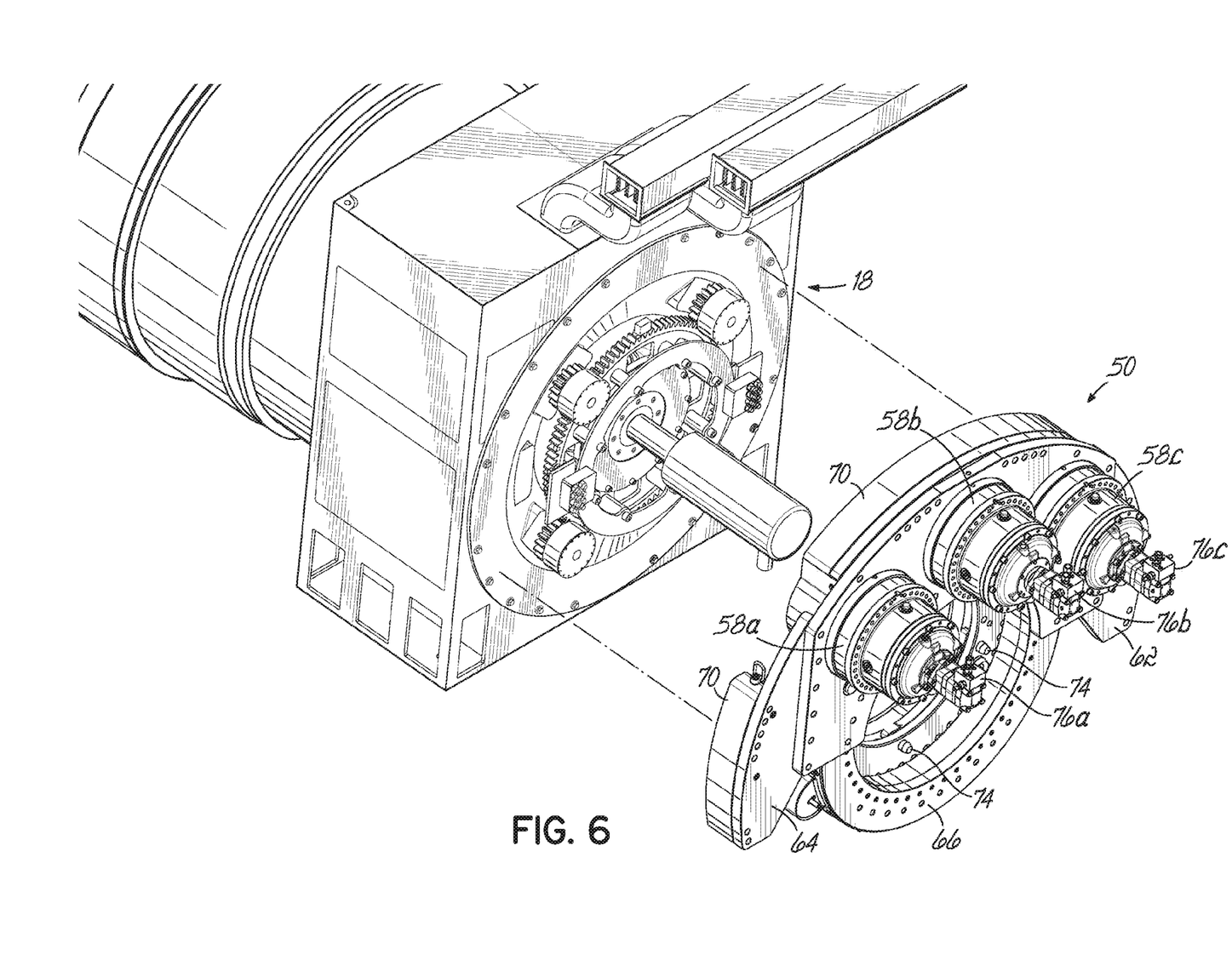
FIG. 6 is an exploded perspective view of the turner gear of FIG. 4 being mounted to a generator of an energy generating unit of a wind turbine.

An exemplary turner gear 50 is illustrated in FIGS. 4, 5 and 6. The turner gear 50 has turner gear motors 58 in the form of torque motors, provided for rotationally driving a nacelle drivetrain. In the illustrated embodiment, the turner gear has three torque motors 58 (see numerals 58a, 58b, 58c), such as hydraulically driven motors, and each with a corresponding pinion gear 60 (see numerals 60a, 60b, 60c). The torque motors 58 may be attached to a motor frame 62, which may hold the motors 58 in spaced, fixed relation to each other. A motor frame 62 may simplify the task of attaching a batch or cluster of torque motors 58 to a drivetrain element. A motor frame 62 may preferably include torque supports 64 that are used to secure the turner gear 50 to the drivetrain 30 using appropriate fasteners (not shown). The motor frame 62 may be attached to a main frame 66 of the turner gear 50 by appropriate fasteners (not shown). The illustrated main frame 66 is shown including a ring gear 68 which is a primary component of an output drive of the turner gear 50. The ring gear 68 is driven by the torque motor pinions 60. One or more spacing blocks 70 may help to accurately position the turner gear 50 at a drivetrain 30. Preferably spacer blocks 70 may locate the motor frame 62 at a desired distance from a drivetrain element, to ensure engagement between the turner gear output drive and the drivetrain element to which the turner gear 50 is drivingly coupled. The pinion gears 60*a*, 60*b*, 60*c* rotatingly engage the ring gear 68 such that when the motors 58*a*, 58*b*, 58*c* operate they rotate the pinion gears 60*a*, 60*b*, 60*c* which rotates the ring gear 68. A ring flange 72 may be mounted to the ring gear 68. The ring flange 72 may also form a part of the turner gear output drive. The ring flange 72 may have a first and a second side. A first side thereof may be mounted to the ring gear 68. A second side of the ring flange 72 may be drivingly connectable to an element of the drivetrain 30. As illustrated in the example, the ring flange 72 may comprise one or more torque pins 74. The torque pins may engage with an element of the drivetrain 30 to transmit torque from the turner gear 50 to the drivetrain 30. In the illustrated example, the second side of the flange 72 may mount to the generator 18 such that when ring gear 68 rotates, the generator rotor rotates, which in turn causes the gearbox output shaft, the gearbox input shaft and the mainshaft 26 to rotate, thereby also rotating the rotor hub 22.

Reference will now be made to exemplary embodiments shown in FIGS. 7-9. Multiple torque motors 58 of the turner gear 50 are connectable via hydraulic fluid lines to a pressurised hydraulic fluid source including a pump 80. The illustrated torque motors 58*a-d* are hydraulic motors. In a most basic mode, hydraulic fluid flows from the pump 80, via a valve block 78 to and from the hydraulic motors 58 and then back to the pump 80. Hydraulic fluid flow between the pump 80 and the motors 58 may be adjusted by means of flow control valves 106, 108, 110 in the valve block 78. The valve block 78 may comprise pump interface ports channeling hydraulic fluid between the pump 80 and the bock 78. The valve block 78 may comprise torque motor interface ports 94*a-d*, 104*a-d*, channeling hydraulic fluid between the block 78 and each of the motors 58*a-d*. The pump interface ports and the motor interface ports 94, 104 are connected by a network of hydraulic fluid lines within the valve block 78. Flow control valves 106, 108, 110 in the hydraulic fluid line network in the valve block 78 adjust the fluid flow path through the valve block 78 between the pump interface ports and the motor interface ports 94, 104. Thereby, the flow control valves 106, 108, 110 in the hydraulic fluid line network in the valve block 78 adjust the fluid flow path between the pump 80 and the respective motors 58*a-d*. Each flow control valve 106, 108, 110 may be linked with hydraulic fluid lines to and from pump 80 interface ports in the valve block 78. In addition, each fluid control valve 106, 108, 110 may be linked with motor interface ports 94, 104 to and from more than one motor 58. Each flow control valve 106, 108, 110 can be selectively adjusted between two fluid control positions, a first, parallel flow position (106*b*, 108*b*, 110*b*) or a second, series flow position (106*a*, 108*a*, 110*a*). As such a flow control valve 106, 108, 110 can be controlled to selectively place associated hydraulic motors 58 in a series flow connection or in a parallel flow connection.

The hydraulic pump 80 may be configured to run at a constant speed to generate a predetermined, fixed fluid flow rate, i.e. measurable in e.g. gallons per minute (gpm) or litres per minute (lpm). In other words, after the hydraulic pump 80 is installed and adjusted, the hydraulic pump 80 may preferably deliver a fixed fluid flow rate at a fixed pressure level when it runs under normal conditions. If the pump 80 were connected exclusively with a single motor 58, then the motor 58 would exhibit a speed and a level of torque corresponding to respectively to the pump's full fluid flow output flow rate and to the pumped fluid pressure. Consequently, the effect of placing e.g. two similar motors 58 in a parallel fluid flow connection, would be to apply half the fluid flowing from the pump 80 to each motor 58, at essentially the full pumped fluid pressure (ignoring minor losses e.g. due to fluid friction in the flow lines). This would generate a level of torque at each driven motor 58 corresponding to a full pressure amount of the fluid passing through it from the pump 80. The halved fluid flow rate due to the reduced, i.e. halved, fluid flow through each motor 58 reduces the motor speed by half, when compared to the speed at which a single motor 58 would run, if all the pumped fluid were carried to and from the one motor 58. Conversely, the effect of placing e.g. two similar motors 58 in a series fluid flow connection, would be to apply the full fluid flow rate from the pump 80 to each motor 58, at essentially half the pumped fluid pressure. This would result in a level of torque at each driven motor 58 corresponding to half the full pressure amount of the fluid passing through it from the pump 80. The full fluid flow rate through each motor 58 would maintain the motor speed at the speed at which a single motor 58 would run, if it were connected exclusively to the pump 80. Similarly, with three motors 58*a-c*, as illustrated in FIGS. 7 and 8, the flow control valves 106, 108, 110 can be set such that there are either in parallel (see flow positions 106*b*, 108*b*, 110*b* shown in FIG. 7) or in series (see flow positions 106*a*, 108*a*, 110*a* shown in FIG. 8). Hence analogously, with three motors 58*a-c* placed in parallel fluid flow connection with a pump 80 as per the example of FIG. 7, and with the pump 80 operating at a constant rate, each motor 58*a,b,c* may run at the same, full torque level as a single connected motor 58 would, even while only at one third of the speed. And with three motors 58*a-c* placed in series fluid flow connection with a pump 80 as per the example of FIG. 8, and with the pump 80 operating at a constant rate, each motor 58*a,b,c* may run at the same, full speed as a single connected motor 58 would, even while only delivering one third of the torque. An alternative arrangement, not shown, might see any two motors e.g. 58*a*, 58*b* placed in parallel, and a remaining motor 58*c* placed in series with the two which are in parallel. This would deliver a level of speed lower than the full speed of a single motor 58 and higher than the one-third speed level of three motors 58 placed in parallel. In other words, it would deliver an intermediate level of performance in respect of both speed and torque, between a complete parallel arrangement and a complete series arrangement of the motors 58.

A control unit 116 associated with the valve block 78 may allow automated control of the flow control valves 106, 108, 110 in the valve block 78. For example, a user interface associated with the control unit 116 may be operable by an operator to select the settings of the flow control valves 106, 108, 110. Alternatively, the control unit may be associated with a computer or wireless network allowing software interaction with the flow control valves 106, 108, 110 and thereby of the motor output characteristics of the turner gear assembly 52.

In embodiments, a flow control body 76 (see numerals 76a, 76b, 76c) may optionally be coupled, respectively, to each motor 58a-c. A flow control body 76, described further below, allows hydraulic fluid lines to be connected to a motor 58 to supply pressurized hydraulic fluid thereto. A flow control body 76 may further include fluid flow management elements described further below, for managing hydraulic fluid to and away from a motor 58. A flow control body 76 may in particular comprise a hydraulic fluid inflow and outflow connection for allowing hydraulic fluid flow connection to and from a hydraulic fluid pumping arrangement. When installing a turner gear assembly 52 at a drivetrain of a nacelle, it may be preferred to first operatively connect the turner gear 50 to a drivetrain element, as mentioned above, and subsequently to connect a hydraulic fluid pumping arrangement of the turner gear assembly 52 to the turner gear 50, e.g. via pipes or hoses, as described below.

Figure 7:
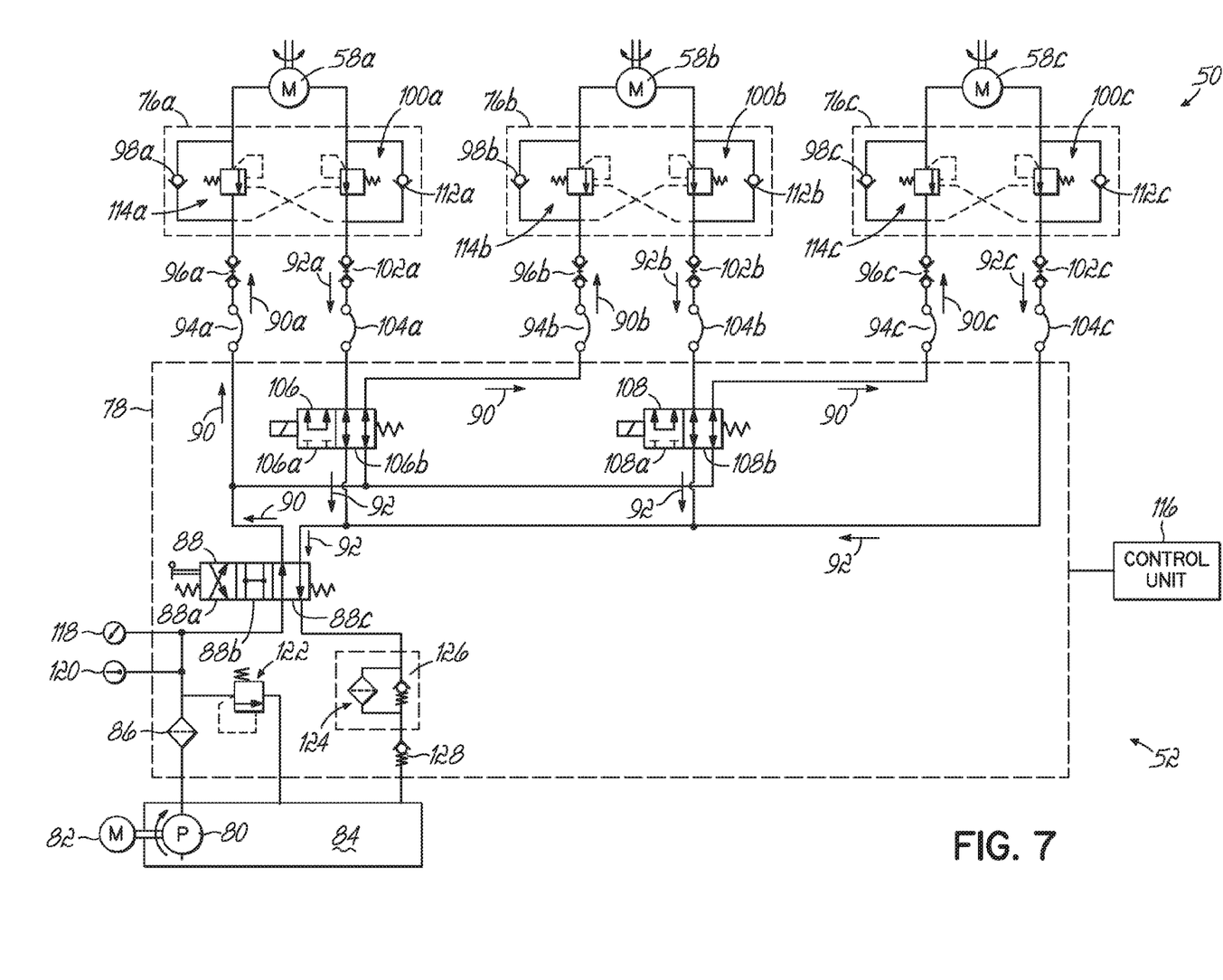
FIG. 7 is a schematic representation of a hydraulic circuit of a turner gear assembly showing with the three hydraulic motors operating in parallel.
Figure 8:
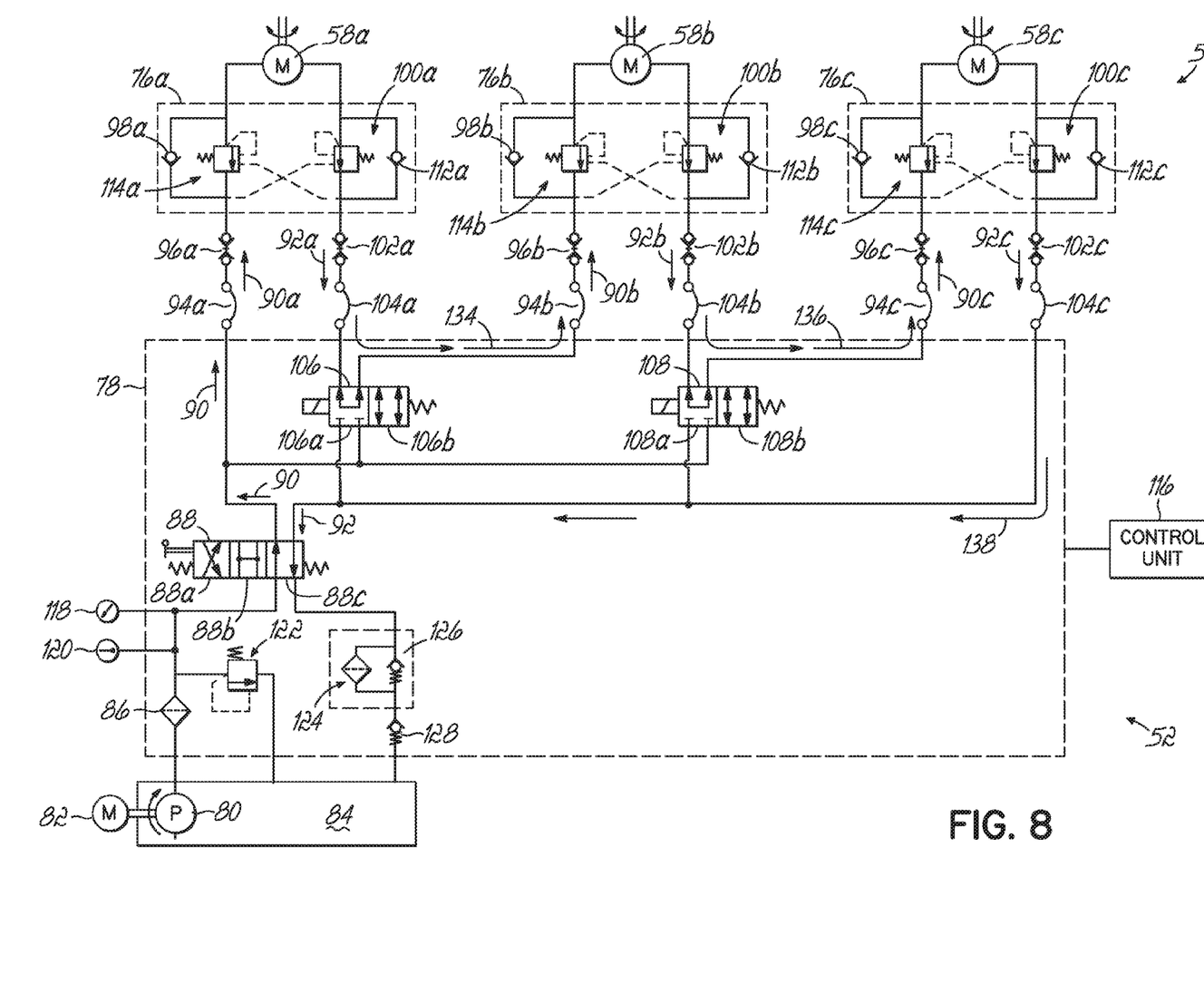
FIG. 8 is a schematic representation similar to FIG. 7, showing the three hydraulic motors operating in series.
Figure 9:
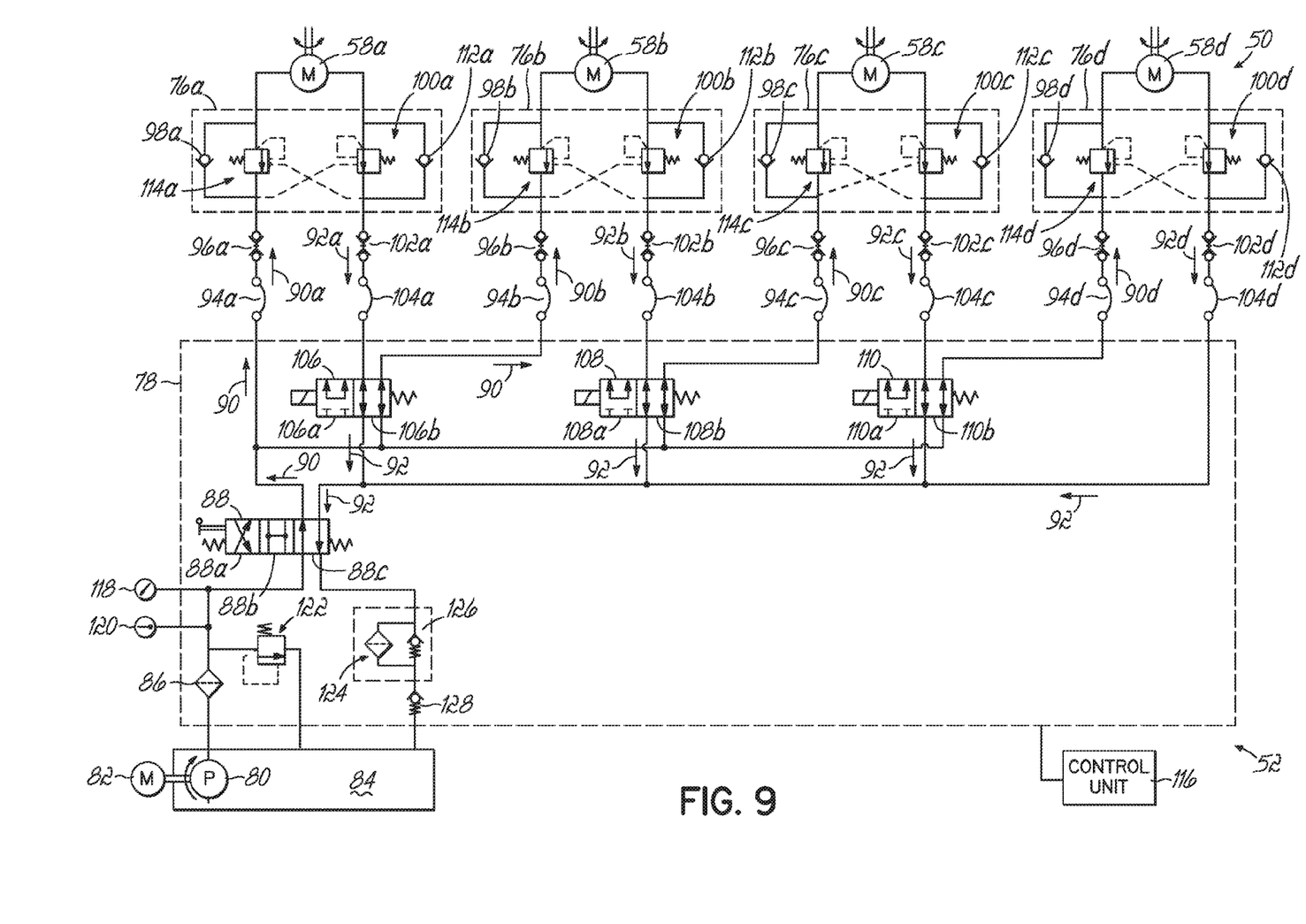
FIG. 9 is a schematic representation similar to FIGS. 7 and 8 showing four hydraulic motors operating in parallel.

FIGS. 7-9 schematically illustrate exemplary embodiments of a turner gear assembly 52 which collectively includes the turner gear 50 and a hydraulic fluid pumping arrangement in the form of a valve block or housing 78, associated with a pump 80 and a control unit 116. The turner gear 50 comprises motors 58 (see numerals 58a,b,c,d), each of which may be associated with an optional flow control body 76. The turner gear 50 is operatively connectable to a hydraulic fluid pumping arrangement including a valve block 78, which is in turn operatively connected to a hydraulic pump 80 associated with a hydraulic fluid tank 84. A pump motor 82 drives the hydraulic pump 80 so the hydraulic pump 80 may send hydraulic fluid (not shown) from the tank 84, through the valve block 78, and to the turner gear 50 and back again in a fluid flow circuit. The term "pump" may be used herein to refer collectively to a pump and a pump motor. Each turner gear motor 58 may be connectable to a valve block 78 via motor interface ports 94, 104. Optionally, each turner gear motor 58 may be associated with a respective flow control body 76 (see numerals 76a-d) which in turn is connectable in hydraulic fluid flow connection with the valve block 78 which controls hydraulic fluid flow to the motors 58 (see numerals 58a-d). The hydraulic fluid flow connection between a motor 58a-d and a said valve block 78 may comprise an inflow and an outflow port 94, 104. Inflow and outflow may be interchangeable in the context of reversing fluid flow direction 90, 92 and thereby reversing the drive direction of the turner gear motors 58. For example, a flow control body 76a-d associated with a respective motor 58a-d may be removably connectable to a valve block 78 associated with a pump 80 via inflow and outflow motor interface ports 94, 104. In particular, a respective motor 58a-d may be removably connectable to a valve block 78 via one or more quick-disconnect couplings 96, 102 on fluid lines in communication with said motor interface ports 94, 104. There may be provided a pair of quick-disconnect couplings 102a, 96a; 102b, 96b; 102c, 96c; 102d, 96d for respective pairs of motor interface ports 94, 104 (see numerals 94a-d, 104a-d) to and from a motor 58. For ease of connection and disconnection between a valve block 78 and a motor 58, fluid inflow and outflow lines to and from the motor interface ports 94, 104 at the valve block 78 may include lengths of flexible hose. An inflow and outflow line in the form of a flexible hose combined with a quick disconnect coupling 96, 102 may facilitate or speed up the temporary installation or removal of a turner gear assembly 52 at a nacelle drivetrain.

The valve block 78 preferably includes one or more fluid flow control valves 106, 108, 110 for selectably controlling fluid flow between the pump 80 and the motors 58. In particular, each, any or all of fluid flow control valves 106a-d, 108a-d, 110a-d in the valve block 78 associated with a pump 80 may be switched to selectably place associated turner gear motors 58a-d in parallel or in series fluid-flow relation relative to the pump 80. Optionally, all the motors 58a-d may thereby be placed in parallel connection such as in FIG. 7 or 9, or all the motors 58a-d may be placed in series connection such as in FIG. 8, or some of the motors 58 may be placed in series connection even while others are placed in parallel connection. Additionally, the valve block 78 may comprise a flow-direction valve 88 interposed between pump ports at the valve block 78 and the flow control valves 106, 108, 110. Optionally, a fluid filter 86 may be provided on the fluid line between the pump 80 and the valve block 78, preferably along a portion of said line which is a fluid outflow line in relation to the pump 80. The flow direction valve 88 may be actuated so the fluid exits the valve block 78 and circulates to the motors 58 in an outbound first fluid flow direction, as represented by arrow 90. After passing through the motors 58, the fluid flow returns into the valve block 78 and through the flow direction valve 88 as in a return fluid flow direction, represented by arrow 92. Thereafter, it exits the valve block 78, and returns to the tank 84. The flow direction valve 88 may have two operational positions, 88a, 88c, each of which corresponds to a respective forward or reverse direction of the turner gear motors 58a-d. The flow-direction valve 88 may be a three-position flow-direction valve 88, as illustrated. Accordingly, the flow-direction valve may optionally also include a third position 88b, described below. In FIG. 7, the fluid is shown flowing through a first direction fluid flow position 88c of the flow-direction valve 88. The fluid flow 90 then flows towards the motors 58a-d as represented by arrows 90a, 90b, 90c, 90d. The fluid to and from the motors 58 may flow through fluid connection lines 94, 104 (see numerals 94a, 94b, 94c, 94d), which may be a flexible hose, to a respective fluid control body 76a-d of a respective motor 58a-d.

The fluid exits motors 58 and returns to the valve block 78 via a fluid connection line and an interface port 94, 104, depending on the momentary fluid flow direction i.e. depending on which direction the motors 58 are turning in. In FIG. 7, fluid returns in a direction 92 from a motor 58 to a valve block 78 via fluid connection line 104 and quick disconnect coupling 102. Additional optional elements in a turner gear assembly may include a hose rupture valve 100a, 100b, 100c, (inside a flow control body 76). This feature, along with associated check valves 98a-c, 100a-c may automatically disable a fluid connection to the motor interface ports 94, 104 at a valve block 78, in case fluid flow lines between the motor 58 and the valve block are breached, e.g. in case a hydraulic fluid connection hose or quick-disconnector 96, 102 between the valve block 78 and a motor 58 is or becomes unseated or is breached in some way. The fluid from motors 58a-d may pass through flow control valves 106, 108, 110 having positions 106a, 106b, 108a, 108b, or 110a, 110b respectively. As illustrated in FIG. 7, the flow control valves 106, 108 aretwo-position flow control valves and are in positions 106b, 108b, respectively. The fluid from motor 58c flows directly back to flow direction valve 88.

The quick disconnect couplings 96a-d and quick disconnect couplings 102a-d permit the valve block 78 to be readily connected to and disconnected from the motors 58, and thus the turner gear 50. It will be appreciated that the valve block 78 may also be readily connected to and disconnected from the pump 80 and tank 84. As such, both the turner gear 50 and the valve block 78 may be temporarily installed in one wind turbine during the blade installation process and then removed and temporarily installed in a different wind turbine for another blade installation process.

With the flow control valves 106, 108 set in parallel connection positions 106b, 108b as illustrated in FIG. 7, the three motors 58ac are considered to be operating in parallel. When all motors 58a-d operate in parallel that may be called a "straight" mode of operation. Another "straight" mode of operation is when all three motors 58a-d operate in series, which will be discussed in more detail below. When some (but not all) of the motors 58 operate in parallel or series, then that may be called a "mixed" mode of operation. For example, looking at the arrangement of FIG. 7, in the straight parallel configuration, each motor 58a-c receives one-third of the fluid flow rate generated by the pump 80 so that each motor 58a-c generates approximately the same amount of output torque which may be used to turn the central hub 22. Should one of the motors 58a-c fail or if a corresponding hose fails and cannot deliver fluid to one of the motors 58a-c, then the other two unaffected motors 58 may continue to function or at least put the central hub 22 in a safe position. The fluid flow rate to each motor 58a will be one third the fluid flow rate from the pump 80 and thereby the motor speed will correspond to one third the maximum speed of the motors 58 were placed in series.

FIG. 7 illustrates the fluid flow circulating in a first fluid flow direction as illustrated by the direction of arrows 90, 92. To change (reverse) the fluid flow to a second fluid flow direction, the flow direction valve 88 may be moved to second fluid flow direction position 88a. With the flow direction valve 88 in its second position 88a, the outbound fluid flow travels to the opposite side of the motors 58a-c so that they turn in the opposite direction. Alternatively, and still as illustrated, if the flow direction valve 88 has an optional third position 88b, called an open center, then with the flow direction valve in its third position, the fluid from the pump 80 returns to the tank 84 and does not flow to the motors 58, so they do not turn. Third position 88b thereby allows the pump 80 to remain operational, but without sending fluid to any of the motors 58.

Control unit 116 may be operatively coupled to the various components illustrated in FIGS. 7-9, such as pump 80, flow direction valve 88, and flow control valves 106, 108, 110 so that an operator may change their respective operations or positions as necessitated by the blade assembly process. A pressure gauge 118 and a temperature gauge 120 may be used to monitor the pressure and temperature of the hydraulic fluid exiting the pump 80. A pressure release valve 122 may be utilized to allow the fluid exiting the pump 80 to return to the tank 84 should the fluid experience downstream pressure over a predetermined high pressure threshold. A filter 86 may be positioned on a hydraulic fluid line in the valve block 78, in particular between a pump interface port and a flow direction valve 88. An additional fluid filter 124 with a bypass check valve 126 may be used to filter the fluid returning to the tank 84. A check valve maybe positioned just prior to the tank 84 to prevent fluid in the various lines from draining back into the tank 84 when the pump 80 is shut off.

FIG. 8 shows the same schematic layout shown in FIG. 7, but the flow control valves 106, 108 are placed in series connection positions 106a, 108a, respectively. In this configuration, the motors 58a, 58b, 58c are considered to be operating in series. As such, each motor 58a, 58b, 58c experiences the same fluid flow rate from the pump 80 but at a lower pressure. Compared to the configuration in FIG. 7, the motors 58a, 58b, 58c will rotate three times faster, but their torque output will be decreased to one-third each. With the two-position flow control valves 106, 108 in positions 106a, 108a, the fluid leaving motor 58a is redirected by two-position flow control valve 106 so that it flows next to motor 58b as represented by arrow 134. Similarly, the fluid leaving motor 58b is redirected by two-position valve 108 so that it flows next to motor 58c as represented by arrow 136. Thus, a single stream of fluid flows through the three motors 58a, 58b, 58c before that fluid returns to the tank 84 as represented by arrow 138. Similar to the above, the direction of the fluid flow may be changed (reversed) by moving the three-position flow direction valve 88 from position 88c to position 88a.

If the blade assembly process requires additional torque beyond what the configuration in FIG. 8 can generate, two-position valve 108 may for example be switched to parallel position 108b so that only motors 58a, 58b operate in series. In this configuration the fluid flow generated by the pump 80 is divided equally between motors 58a, 58b and motor 58c such that motors 58a, 58b generate less torque than motor 58c, but they each operate at the same speed. In this configuration, the overall torque output is greater than the configuration in FIG. 8 (all motors in series), but the rotational speed is less. In yet another configuration, motor 58c could be disconnected altogether, such as by disconnecting the quick disconnect 96c so that no fluid flows to motor 58c and only motors 58a, 58b operate in series. Thus, an operator may configure the different two-way flow control valves 106, 108 and/or disconnect a particular motor 58a-58c to achieve a required output torque or a desired rotational speed, depending of the requirements of the particular blade assembly. Alternatively, one or more shutoff valves (not shown) may be used to specifically control the fluid flow to the individual motors 58a, 58b, 58c so that each motor 58a, 58b, 58c may be selectively shutoff (or turned on) to meet the torque requirements during the blade installation process.

FIG. 9 schematically illustrates a similar layout shown in FIG. 7, but with an additional motor 58d with corresponding components of flow control body 76d, quick disconnect couplings 96d, 102d, check valves 98d, 112d, hose rupture valve 100d, 114d. The motor 58d is connected to motor interface ports 94d, 104d at the valve block 78. To accommodate operatively connecting the motor 58d to the pump 80, the valve block 78 may include an additional flow control valve 110 which may be a two-position valve with a respective positions 110a for a series connection and a position 110b for a parallel connection. By manipulating the flow control valve 110, the motors 58c, 58d may thereby be run in parallel or series as dictated by the blade assembly process. It will be appreciated that additional motors may be added to the turner gear 50 to increase the torque output of the turner gear as torque requirements increase. Similarly, a corresponding flow control valve may be added to the valve block 78 for each additional motor so that each additional motor may be run in parallel or in series with the other motors in the turner gear 50. In FIG. 9, the flow control valves 106, 108, 110 may be switched between series connection and parallel connection positions 106a, 106b, 108a, 108b, 110a, 110b to put some or all of the motors 58a-58d in series so that varying amounts of output torque may be produced by the turner gear 50. Again, just like in the three-motor configuration of FIGS. 7 and 8, an operator may configure the different flow control valves 106, 108, 110 via controller 116 and/or disconnect a particular motor 58a-58d to achieve a required output torque or a desired rotational speed, depending of the torque requirements of the particular blade assembly.

In one advantageous aspect of the invention, a "standardized" turner gear assembly may be used on different wind turbines having different sizes and different torque requirements. By design, the standardized turner gear may be used during the blade installation process on respective large, medium, and small wind turbines, despite the possibility that the torque requirements may vary widely for each installation. In addition, by using a standardized turner gear assembly, the installer does not have to be concerned with using a turner gear that is not compatible with either the structure (e.g., the gearbox or generator) or the torque requirements of the wind turbine. By manipulating the various valves in the valve block, the installer may configure the turner gear 50 to achieve a sufficient amount of torque without sacrificing rotational speed.

The flexibility of the turner gear assembly as disclosed herein also allows the installer to configure the turner gear to compensate for wind conditions at the work site. In this regard, wind conditions during the wind blade installation process may increase the torque requirements placed upon the turner gear e.g. by adding increased wind resistance against a turning motion of a blade rotor. To address the wind loading, the turner gear may be designed to produce not only the torque required to turn the unbalanced rotor, but also the torque required to overcome wind loading at the work site. Thus, where low wind conditions are present during the blade installation process, the turner gear assembly may be configured to generate a lower amount of torque, which may allow the turner gear to turn faster. In contrast, if moderate to high wind conditions are present at the work site, the turner gear assembly may be configured to produce additional torque, but at a slower rotational speed. Thus, a single turner gear assembly may be adapted for use on a wide range of wind turbines during a wide range of wind conditions. By adjusting the settings of the turner gear assembly for the specific wind turbine and installation (and conditions), a balance between torque requirements and rotational speed of the central hub may be achieved. A valve block at a turner gear assembly may be integral with the turner gear motors or separably connectable thereto.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention is not limited to the specific embodiments or details or illustrative examples shown and described herein.

The invention claimed is:

1. A turner gear assembly for turning an unbalanced rotor of a wind turbine having a drivetrain, comprising:
a turner gear configured to couple to a said drivetrain and having at least two motors; and
a valve block operatively connectable to the turner gear and including a first flow control valve configured to be in fluid communication with a pump and with the at least two motors of the turner gear, the first flow control valve selectively moveable between a first fluid control position and a second fluid control position,
wherein when the first flow control valve is in the first fluid control position, the at least two motors operate in parallel, and wherein when the first flow control valve is in the second fluid control position, the at least two motors operate in series.

2. The turner gear assembly of claim 1, wherein the turner gear has first, second, and third motors, wherein the first flow control valve is configured to be in fluid communication with the first and second motors, the valve block further comprising:
a second flow control valve configured to be in fluid communication with the pump and with the second and third motors of the turner gear, the second flow control valve selectively moveable between a first fluid control position and a second fluid control position.

3. The turner gear assembly of claim 2, wherein the first and second fluid control positions of the respective first flow control valve and the second flow control valve are selectively configured such that the first, second, and third motors operate in parallel, operate in series, or operate in a combination of parallel and series.

4. The turner gear assembly of claim 2, wherein when the first flow control valve is in its first fluid control position and the second flow control valve is in its first fluid control position, the first, second and third motors operate in parallel.

5. The turner gear assembly of claim 2, wherein when the first flow control valve is in its second fluid control position and the second flow control valve is in its second fluid control position, the first, second, and third motors operate in series.

6. The turner gear assembly of claim 2, wherein when the first flow control valve is in its second fluid control position and the second flow control valve is in its first fluid control position, the first and second motors operate in series and the third motor operates in parallel to the combination of the first and second motors.

7. The turner gear assembly of claim 2, wherein the turner gear has further comprising a fourth motor, and wherein a third flow control valve is provided, configured to be in fluid communication with the pump and with the third and fourth motors of the turner gear, the third flow control valve selectively moveable between a first fluid control position and a second fluid control position.

8. The turner gear assembly of claim 7, wherein when the first flow control valve is in its second fluid control position, the second flow control valve is in its first fluid control position, and the third flow control valve is in its second fluid control position, the first and second motors operate in series with each other and the third and fourth motors operate in series with each other.

9. The turner gear assembly of claim 7, wherein the first, second, and third fluid control positions of the respective first, second, and third flow control valves are selectively configured such that the first, second, third, and fourth motors operate in parallel, operate in series, or operate in a combination of parallel and series.

10. The turner gear assembly of claim 1, further comprising a control unit configured to selectively move the first flow control valves between a respective first and second position.

11. The turner gear assembly of claim 1, wherein the valve block further comprises at least one flow direction valve operatively connected to the pump, the flow direction valve selectively movable between first and second positions, the first position configured to allow the fluid flowing from the pump to move in a first fluid flow direction through the at least two motors, and the second position configured to allow the fluid from the pump to move in a second fluid flow direction through the at least two motor.

12. A method of operating the turner gear assembly according to claim 1 for turning an unbalanced rotor of a wind turbine, the method comprising:
    operatively connecting said turner gear assembly to a wind turbine drivetrain;
    selecting between the first fluid control position and the second fluid control position of the first flow control valve, wherein when the first fluid control position is selected, the at least two motors operate in parallel, and wherein when the second fluid control position is selected, the at least two motors operate in series; and
    operating the turner gear assembly with the first fluid control valve in the selected fluid control position.

13. The method of claim 12, further comprising either:
    selecting the first fluid control position of the first flow control valve such that the two motors operate in parallel; or
    selecting the second fluid control position of the first flow control valve such that the two motors operate in parallel.

14. The method of claim 12, wherein the turner gear has first, second, and third motors, wherein the first flow control valve is in fluid communication with the first and second motors of the turner gear, and the valve block further includes a second flow control valve in fluid communication with the pump and with the second and third motors of the turner gear, the second flow control valve selectively moveable between a first fluid control position and a second fluid control position, the method further comprising:
    selecting between the first fluid control position and the second fluid control position of the second flow control valve, such that the first, second, and third motors operate in parallel, operate in series, or operate in a combination of parallel and series; and
    operating the turner gear assembly with the first fluid control valve in its selected fluid control position and the second fluid control valve in its selected fluid control position.

15. The method of claim 12, wherein the valve block further includes a flow direction valve operatively connected to the pump, the flow direction valve selectively movable between first and second positions, the method further comprising:
    providing a control unit configured to selectively move the flow direction valve between its first and second positions and selectively move the first flow control valve between its first and second positions,
    wherein the selecting between the first control position and the second control position is commanded by the control unit.

16. A method of turning an unbalanced rotor of a wind turbine using a turner gear assembly, comprising:
    providing a first wind turbine having a rotor hub with a plurality of blade sites, the first wind turbine further having a drivetrain operatively coupled to the rotor hub, the method comprising:
    providing the turner gear assembly of claim 1;
    operatively coupling the turner gear to the drivetrain of the first wind turbine and operatively connecting the valve block to the turner gear and to a pump;
    configuring the valve block to operate the at least two motors in a first operational mode;
    operating the pump to actuate the at least two motors and turn the central hub until one of the plurality of blade sites is in a blade handling position;
    attaching/removing a wind turbine blade to/from the blade site at the blade handling position; and
    repeating the operating and attaching steps until the first wind turbine has all of its wind turbine blades attached/removed to/from a respective one of the plurality of blade sites.

17. The method of claim 16, further comprising:
    removing the turner gear assembly from the first wind turbine;
    providing the turner gear assembly to a second wind turbine having a rotor hub with a plurality of blade sites;
    attaching the turner gear to a drivetrain of the second wind turbine and operatively connecting the valve block to the turner gear;
    configuring the valve block to operate the at least two motors in a second operational mode different from the first operational mode;
    operating a pump to actuate the at least two motors and turn the rotor hub until one of the plurality of blade sites is in a blade handling position;
    attaching/removing a wind turbine blade to/from the blade site at the blade handling position; and
    repeating the operating and attaching steps until the second wind turbine has all of its wind turbine blades attached/removed to/from a respective one of the plurality of blade sites.

18. The method of claim 16 wherein operating the pump further comprises:
    coupling the turner gear to a hydraulic system of the wind turbine having a pump; and
    operating the pump of the wind turbine hydraulic system to operate the turner gear.

19. The method of claim 18 wherein the hydraulic system is a pitch control system of the wind turbine.

20. The method of claim 16, wherein the turner gear is coupled to a generator of said drivetrain or wherein the turner gear is coupled to a gearbox output shaft of said drivetrain or wherein the turner gear is coupled to a gearbox input shaft of said drivetrain.

* * * * *